US012658155B2

(12) United States Patent
Hai

(10) Patent No.: US 12,658,155 B2
(45) Date of Patent: Jun. 16, 2026

(54) METHOD FOR ADJUSTING CHROMATICITY OF DISPLAY DEVICE AND THE DISPLAY DEVICE

(71) Applicant: Shenzhen China Star Optoelectronics Semiconductor Display Technology Co., Ltd., Shenzhen (CN)

(72) Inventor: Bo Hai, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 1 day.

(21) Appl. No.: 17/785,062

(22) PCT Filed: Apr. 20, 2022

(86) PCT No.: PCT/CN2022/087939

§ 371 (c)(1),
(2) Date: Jun. 14, 2022

(87) PCT Pub. No.: WO2023/184623

PCT Pub. Date: Oct. 5, 2023

(65) Prior Publication Data

US 2025/0054456 A1 Feb. 13, 2025

(30) Foreign Application Priority Data

Apr. 2, 2022 (CN) ........................ 202210351065.5

(51) Int. Cl.

| | |
|---|---|
| ***G09G 3/36*** | (2006.01) |
| ***G09G 3/00*** | (2006.01) |
| ***G09G 3/34*** | (2006.01) |

(52) U.S. Cl.
CPC .......... *G09G 3/3607* (2013.01); *G09G 3/006* (2013.01); *G09G 3/3413* (2013.01); *G09G 2320/0242* (2013.01); *G09G 2330/12* (2013.01)

(58) Field of Classification Search
None
See application file for complete search history.

(56) References Cited

U.S. PATENT DOCUMENTS

| | | | | |
|---|---|---|---|---|
| 11,810,531 | B1 * | 11/2023 | Yi | G09G 5/10 |
| 2011/0153284 | A1 * | 6/2011 | Li | G02F 1/134309 703/1 |

(Continued)

FOREIGN PATENT DOCUMENTS

| | | | |
|---|---|---|---|
| CN | 101449308 | A | 6/2009 |
| CN | 102473388 | A | 5/2012 |

(Continued)

OTHER PUBLICATIONS

International Search Report in International application No. PCT/CN2022/087939,mailed on Nov. 25, 2022.

(Continued)

*Primary Examiner* — Andre L Matthews
(74) *Attorney, Agent, or Firm* — Nathan & Associates; Menachem Nathan

(57) ABSTRACT

A method for adjusting chromaticity of a display device and the display device are provided. The method for adjusting the chromaticity of the display device can adjust an aperture ratio of a first sub-pixel of a display device to meet the user's demand for chromaticity of a white image, improve a color shift problem existing in the conventional display devices, and enhance display effect of the display device.

16 Claims, 3 Drawing Sheets

(56) References Cited

U.S. PATENT DOCUMENTS

| | | | | |
|---|---|---|---|---|
| 2016/0131968 | A1* | 5/2016 | Okamoto | H01S 5/0683 315/151 |
| 2016/0240123 | A1* | 8/2016 | Wu | G01M 11/02 |
| 2020/0312214 | A1* | 10/2020 | Huang | G09G 3/2003 |
| 2024/0212647 | A1* | 6/2024 | Wang | G09G 3/2003 |

FOREIGN PATENT DOCUMENTS

| | | | |
|---|---|---|---|
| CN | 105976784 | A | 9/2016 |
| CN | 107068114 | A | 8/2017 |
| CN | 110827750 | A | 2/2020 |
| CN | 111681580 | A | 9/2020 |
| WO | 2012090807 | A1 | 7/2012 |

OTHER PUBLICATIONS

Written Opinion of the International Search Authority in International application No. PCT/CN2022/087939,mailed on Nov. 25, 2022.

* cited by examiner

METHOD FOR ADJUSTING CHROMATICITY OF DISPLAY DEVICE AND THE DISPLAY DEVICE

TECHNICAL FIELD

The present disclosure relates to the display technology field, and more particularly to a method for adjusting chromaticity of a display device and the display device.

BACKGROUND ART

In a liquid crystal display (LCD), a liquid crystal material is served as a basic component. The liquid crystal material is filled between two parallel plates. An arrangement of molecules in the liquid crystal material by voltages to achieve an objective of shading and transparency, thereby displaying images of different shades and staggered patterns. Moreover, as long as a filter layer with three primary colors is disposed between the two parallel plates, displaying at least one color image can be realized.

Technical Problem

Currently, when users use liquid crystal display devices, they find that the liquid crystal display devices have a color shift problem in a 255-level white image. This needs to be improved. Chromaticity of a white image of a current liquid crystal display device is jointly determined by a liquid crystal display panel and a backlight source. It is considered that the backlight source needs to be compatible with screens of different users and cost of adjusting the backlight source is high. Accordingly, it is necessary to adjust the liquid crystal display panel to meet chromaticity requirements of the white image of the liquid crystal display device.

Technical Solution

An objective of the present disclosure is to provide a method for adjusting chromaticity of a display device and the display device capable of solving the color shift problem of the white image of the conventional liquid crystal display.

To solve the above-mentioned problems, the present disclosure provides a method for adjusting chromaticity of a display device comprising the following step: in step S10, initial spectra of a first sub-pixel, a second sub-pixel, a third sub-pixel, and the backlight source of an initial display device are obtained, and an initial transmission spectrum of a display panel of the initial display device is calculated; in step S20, an initial aperture ratio of the first sub-pixel of the initial display device is obtained, at least one test aperture ratio of a first sub-pixel of at least one test display device is preset, and a relative change value of each of the at least one test aperture ratio relative to the initial aperture ratio is calculated; in step S30, at least one test transmission spectrum of a display panel of each of the at least one test display device is calculated according to the steps S10 and S20; in step S40, tristimulus values X, Y, and Z of each of the at least one test display device and tristimulus values X, Y, and Z of the initial display device are calculated according to each of the at least one test transmission spectrum and the initial transmission spectrum; in step S50, chromaticity Wx and Wy corresponding to a white image of the initial display device and chromaticity Wx and Wy corresponding to a white image of each of the at least one test display device are calculated according to the step S40; in step S60, a different value between the chromaticity Wx corresponding to the white image of each of the at least one test display device and the chromaticity Wx corresponding to the white image of the initial display device is calculated according to the step S50, and a calculation formula between the relative change value of the aperture ratio of the first sub-pixel and Wx is fit and obtained; and a different value between the chromaticity Wy corresponding to the white image of each of the at least one test display device and the chromaticity Wy corresponding to the white image of the initial display device is calculated according to the step S50, and a calculation formula between the relative change value of the aperture ratio of the first sub-pixel and Wy is fit and obtained; and in step S70, Wx required by a user is obtained, a relative change value of the aperture ratio of the first sub-pixel corresponding to the Wx required by the user is calculated according to the step S60, and an aperture ratio of the first sub-pixel corresponding to the Wx required by the user is calculated.

Further, the first sub-pixel is a red sub-pixel.

Further, in the step S10, the initial transmission spectrum is equal to (the initial spectrum of the first sub-pixel+the initial spectrum of the second sub-pixel+the initial spectrum of the third sub-pixel)/the initial spectrum of the backlight source.

Further, in the step S20, the relative change value of each of the at least one test aperture ratio relative to the initial aperture ratio is equal to each of the at least one test aperture ratios/the initial aperture ratio.

Further, in the step S30, the test transmission spectrum of the display panel of each of the at least one display device is equal to (the initial spectrum of the first sub-pixel×the relative change value of each of the at least one test aperture ratio relative to the initial aperture ratio+the initial spectrum of the second sub-pixel+the initial spectrum of the third sub-pixel)/the initial spectrum of the backlight source.

Further, in the step S40, the tristimulus values X, Y, and Z of each of the at least one test display device and tristimulus values X, Y, and Z of the initial display device are calculated according to the following formula:

$$X = k\int_{\lambda} S(\lambda)\cdot P(\lambda)\cdot \bar{x}(\lambda)d\lambda,$$

$$Y = k\int_{\lambda} S(\lambda)\cdot P(\lambda)\cdot \bar{y}(\lambda)d\lambda, \text{ and}$$

$$Z = k\int_{\lambda} S(\lambda)\cdot P(\lambda)\cdot \bar{z}(\lambda)d\lambda;$$

wherein K is an adjustment coefficient, S(λ) is the initial spectrum of the backlight source of the initial display device or an initial spectrum of a backlight source of each of the at least one test display device, P(λ) is the initial transmission spectrum or the test transmission spectrum, and $\bar{x}(\lambda)$, $\bar{y}(\lambda)$, and $\bar{z}(\lambda)$ are respectively standard chromaticity observer spectral tristimulus values.

Further, in the step S50, the chromaticity corresponding to the white image of the initial display device and each of the at least one test display devices is calculated according to the following formula:

$$Wx = \frac{Y}{X+Y+Z} \text{ and } Wy = \frac{X}{X+Y+Z}.$$

Further, in the step S60, the calculation formula between the relative change value of the aperture ratio of the first sub-pixel and the Wx is fit and obtained as follows: Wx=−0.003374x+0.02321, and x is the relative change value of the aperture ratio of the first sub-pixel of each of the at least one test display device.

Further, in the step S60, the calculation formula between the relative change value of the aperture ratio of the first sub-pixel and the Wy is fit and obtained as follows: Wy=−0.000296x+0.002039, and x is the relative change value of the aperture ratio of the first sub-pixel of each of the at least one test display device.

To solve the above-mentioned problems, the present disclosure provides a display device performing chromaticity adjustment by the method for adjusting the chromaticity of the display device.

Advantageous Effects

The method for adjusting the chromaticity of the display device of the present disclosure can adjust the aperture ratio of the first sub-pixel of the display device to meet a user's demand for the chromaticity of the white image, improve a color shift problem existing in the conventional display devices, and enhance display effect of the display device.

BRIEF DESCRIPTION OF DRAWINGS

To describe the technical solutions of the embodiments of the present disclosure more clearly, the following briefly introduces the accompanying drawings required for describing the embodiments. Apparently, the accompanying drawings in the following description show only some embodiments of the present disclosure, and those skilled in the art may still derive other drawings from these accompanying drawings without creative efforts.

Figure 1:
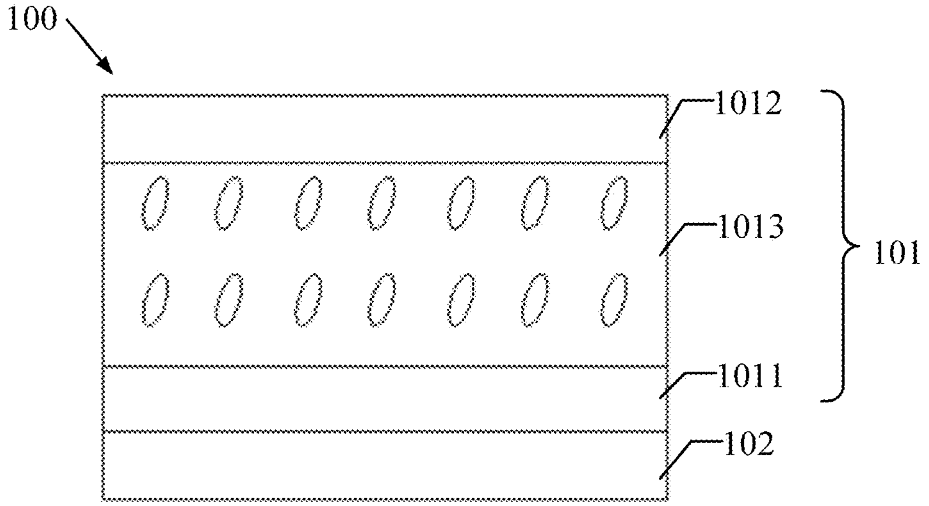
FIG. 1 illustrates a structural schematic diagram of a display device of the present disclosure.

Numerals in the drawings are described as follows:

100: display device; 101: display panel; 102: backlight source; 1011: array substrate; 1012: color filter substrate; 1013: liquid crystal layer.

DETAILED DESCRIPTION OF EMBODIMENTS

The preferred embodiments of the present disclosure are described below with reference to the accompanying drawings to fully introduce the technical content of the present disclosure to those skilled in the art to illustrate that the present disclosure can be implemented. As such, the technical content of the present disclosure is clearer and easier to be understood for those skilled in the art. However, the present disclosure can be embodied in many different forms of embodiments, and the scope of the present disclosure is not limited to the embodiments set forth herein. The description of the following embodiments is not intended to limit the scope of the present disclosure.

Directional terms described by the present disclosure, such as upper, lower, front, back, left, right, inner, outer, side and etc., are only directions by referring to the accompanying drawings, and thus the used directional terms are used to describe and understand the present disclosure. However, the protective scope of the present disclosure is not limited thereto.

In the drawings, structurally identical components are designated by the same reference numerals, and structurally or functionally similar components throughout are designated by similar numerical reference numerals. The dimensions and thicknesses of each component shown in the drawings are arbitrarily shown. The size and thickness of each component are not limited.

Embodiment 1

As shown in FIG. 1, a display device 100 provided by an embodiment. The display device 100 includes a display panel 101 and a backlight source 102.

As shown in FIG. 1, the display panel 101 includes an array substrate 1011, a color filter substrate 1012, and a liquid crystal layer 1013.

The array substrate 1011 includes thin film transistors (not shown) and other film layers.

The color filter substrate 1012 is disposed opposite to the array substrate 1011. The color filter substrate 1012 includes a black matrix (not shown), a color filter (not shown), and other film layers.

The liquid crystal layer 1013 is disposed between the array substrate 1011 and the color filter substrate 1012.

The backlight source 102 is disposed on one side of the array substrate 1011 away from the color filter substrate 1012. The backlight source 102 can be an edge-type backlight source or a direct-type backlight source.

Figure 2:
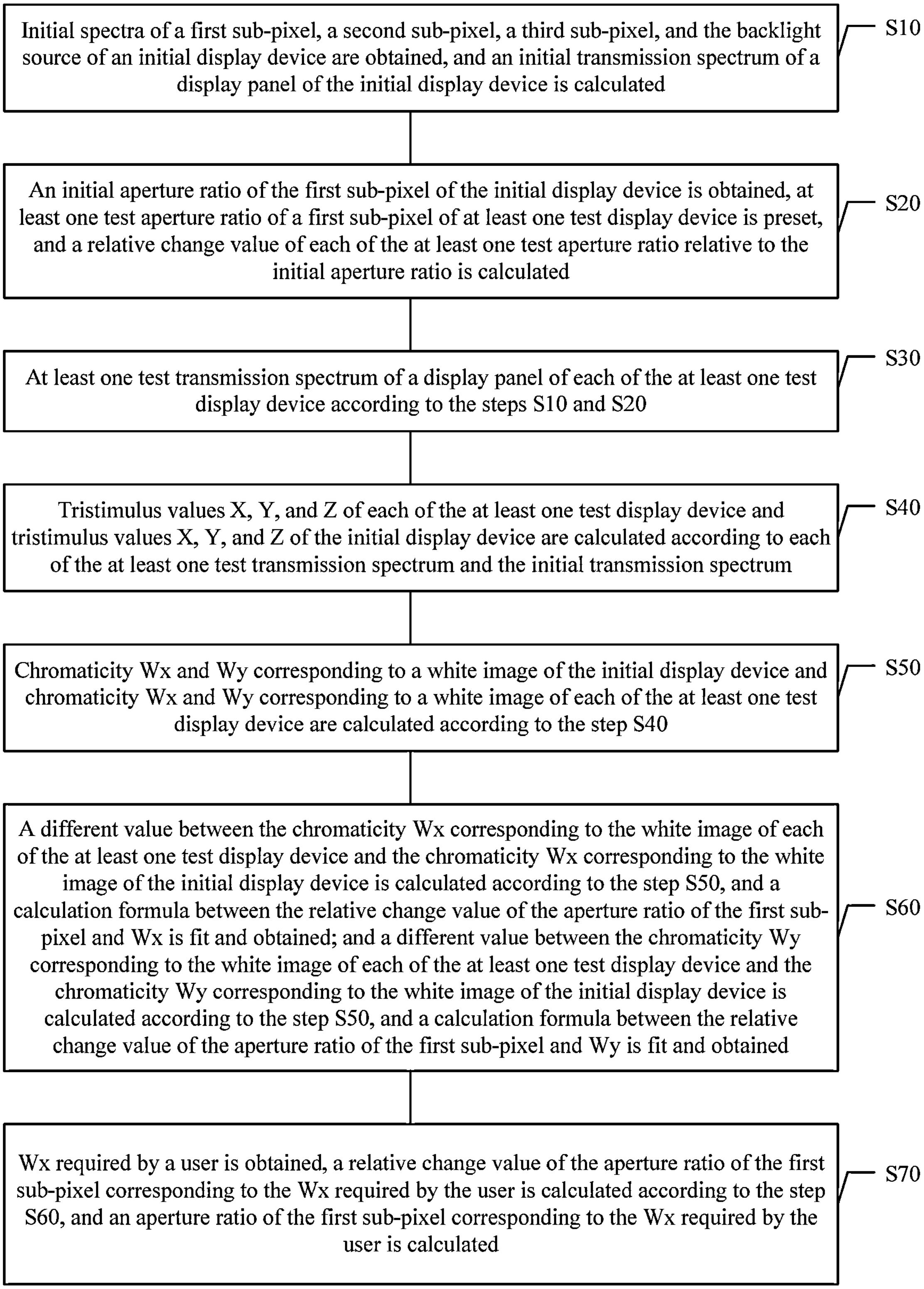
FIG. 2 illustrates a flowchart of a method for adjusting chromaticity of a display device of the present disclosure.

As shown in FIG. 2, a method for adjusting chromaticity of a display device provided by an embodiment includes the following steps. In step S10, initial spectra of a first sub-pixel, a second sub-pixel, a third sub-pixel, and the backlight source of an initial display device are obtained, and an initial transmission spectrum of a display panel of the initial display device is calculated. In step S20, an initial aperture ratio of the first sub-pixel of the initial display device is obtained, at least one test aperture ratio of a first sub-pixel of at least one test display device is preset, and a relative change value of each of the at least one test aperture ratio relative to the initial aperture ratio is calculated. In step S30, at least one test transmission spectrum of a display panel of each of the at least one test display device is calculated according to the steps S10 and S20. In step S40, tristimulus values X, Y, and Z of each of the at least one test display device and tristimulus values X, Y, and Z of the initial display device are calculated according to each of the at least one test transmission spectrum and the initial transmission spectrum. In step S50, chromaticity Wx and Wy corresponding to a white image of the initial display device and chromaticity Wx and Wy corresponding to a white image of each of the at least one test display device are calculated according to the step S40. In step S60, a different value between the chromaticity Wx corresponding to the white image of each of the at least one test display device and the chromaticity Wx corresponding to the white image of the initial display device is calculated according to the step S50, and a calculation formula between the relative change value of the aperture ratio of the first sub-pixel and Wx is fit and obtained; and a different value between the chromaticity Wy corresponding to the white image of each of the at least one test display device and the chromaticity Wy corresponding to the white image of the initial display device is calculated according to the step S50, and a calculation formula between the relative change value of the aperture ratio of the first sub-pixel and Wy is fit and obtained. In step S70, Wx required by a user is obtained, a relative change value of the aperture ratio of the first sub-pixel corresponding to the Wx required by the user is calculated according to the step S60, and an aperture ratio of the first sub-pixel corresponding to the Wx required by the user is calculated.

In the present embodiment, in the step S10, the initial frequency spectra of the first sub-pixel, the second sub-pixel, and the third sub-pixel of the initial display device at a gray level of 255 are obtained. In other embodiments, the initial frequency spectra of the first sub-pixel, the second sub-pixel, and the third sub-pixel of the initial display device at any other gray level can also be obtained.

When the aperture ratios of the first sub-pixel, the second sub-pixel and the third sub-pixel are all changed, the Wx and the Wy corresponding to the white image are affected at the same time, and optical performance of the display device is affected greatly. In detail, transmittance of the display device is affected greatly. In the present embodiment, it is found that a red sub-pixel has a greater impact on the Wx and a less impact on the Wy. Therefore, in the present embodiment, the first sub-pixel is a red sub-pixel. The second sub-pixel is a green sub-pixel. The third sub-pixel is a blue sub-pixel. Alternatively, the second sub-pixel is a blue sub-pixel. The third sub-pixel is a green sub-pixel.

In the step S10, the initial transmission spectrum is equal to (the initial spectrum of the first sub-pixel+the initial spectrum of the second sub-pixel+the initial spectrum of the third sub-pixel)/the initial spectrum of the backlight source.

In the step S20, the relative change value of each of the at least one test aperture ratio relative to the initial aperture ratio is equal to each of the at least one test aperture ratios/the initial aperture ratio. The initial aperture ratio of the first sub-pixel is equal to a display area of the first sub-pixel/an area of the first sub-pixel.

In the step S30, the test transmission spectrum of the display panel of each of the at least one display device is equal to (the initial spectrum of the first sub-pixel×the relative change value of each of the at least one test aperture ratio relative to the initial aperture ratio+the initial spectrum of the second sub-pixel+the initial spectrum of the third sub-pixel)/the initial spectrum of the backlight source.

In the step S40, the tristimulus values X, Y, and Z of each of the at least one test display device and tristimulus values X, Y, and Z of the initial display device are calculated according to the following formula: $X=k\int_{\lambda}S(\lambda)\cdot P(\lambda)\cdot \bar{x}(\lambda)d\lambda$, $Y=k\int_{\lambda}S(\lambda)\cdot P(\lambda)\cdot \bar{y}(\lambda)d\lambda$, and $Z=k\int_{\lambda}S(\lambda)\cdot P(\lambda)\cdot \bar{z}(\lambda)d\lambda$. K is an adjustment coefficient. $S(\lambda)$ is the initial spectrum of the backlight source of the initial display device or an initial spectrum of a backlight source of each of the at least one test display device. $P(\lambda)$ is the initial transmission spectrum or the test transmission spectrum. $\bar{x}(\lambda)$, $\bar{y}(\lambda)$, and $\bar{z}(\lambda)$ are respectively standard chromaticity observer spectral tristimulus values.

In the step S50, the chromaticity corresponding to the white image of the initial display device and each of the at least one test display devices is calculated according to the following formula:

$$Wx = \frac{X}{X+Y+Z} \text{ and } Wy = \frac{Y}{X+Y+Z}.$$

As shown in Table 1, in the present embodiment, absolute values of the Wx and the Wy are simulated and calculated when the relative change value of the test aperture ratio of the first sub-pixel of the test display device relative to the initial aperture ratio of the first sub-pixel of the initial display device is ranged from 100% to 130% and from 70% to 100%.

TABLE 1

Absolute value simulation of influence of aperture ratio change of the first sub-pixel (R) on a white point

| | Relative change value of the aperture ratio | Wx | Wy |
|---|---|---|---|
| Initial aperture ratio of the first sub-pixel (R) is increased | 130% | 0.2965 | 0.2799 |
| | 125% | 0.2935 | 0.2796 |
| | 120% | 0.2903 | 0.2793 |
| | 115% | 0.2872 | 0.2791 |
| | 110% | 0.2839 | 0.2788 |
| | 105% | 0.2807 | 0.2785 |
| Initial aperture ratio of the first sub-pixel (R) | 100% | 0.2773 | 0.2782 |
| Initial aperture ratio of the first sub-pixel (R) is decreased | 95% | 0.2739 | 0.2779 |
| | 90% | 0.2705 | 0.2776 |
| | 85% | 0.2669 | 0.2773 |
| | 80% | 0.2634 | 0.2770 |
| | 75% | 0.2597 | 0.2766 |
| | 70% | 0.2560 | 0.2763 |

As shown in Table 2, in the present embodiment, a relative change value of the Wx relative to the chromaticity Wx corresponding to the white image of the initial display device is simulated and calculated when the relative change value of the test aperture ratio of the first sub-pixel of the test display device relative to the initial aperture ratio of the first sub-pixel of the initial display device is ranged from 100% to 130% and from 70% to 100%.

TABLE 2

Relative value simulation of influence of aperture ratio change of the first sub-pixel (R) on a white point

| | Relative change value of the aperture ratio | Wx+ | Wy+ |
|---|---|---|---|
| Initial aperture ratio of the first sub-pixel (R) is increased | 130% | 0.019 | 0.002 |
| | 125% | 0.016 | 0.001 |
| | 120% | 0.013 | 0.001 |
| | 115% | 0.010 | 0.001 |
| | 110% | 0.007 | 0.001 |
| | 105% | 0.003 | 0.000 |
| Initial aperture ratio of the first sub-pixel (R) | 100% | 0.000 | 0.000 |
| Initial aperture ratio of the first sub-pixel (R) is decreased | 95% | −0.003 | 0.000 |
| | 90% | −0.007 | −0.001 |
| | 85% | −0.010 | −0.001 |
| | 80% | −0.014 | −0.001 |
| | 75% | −0.018 | −0.002 |
| | 70% | −0.021 | −0.002 |

Figure 3:
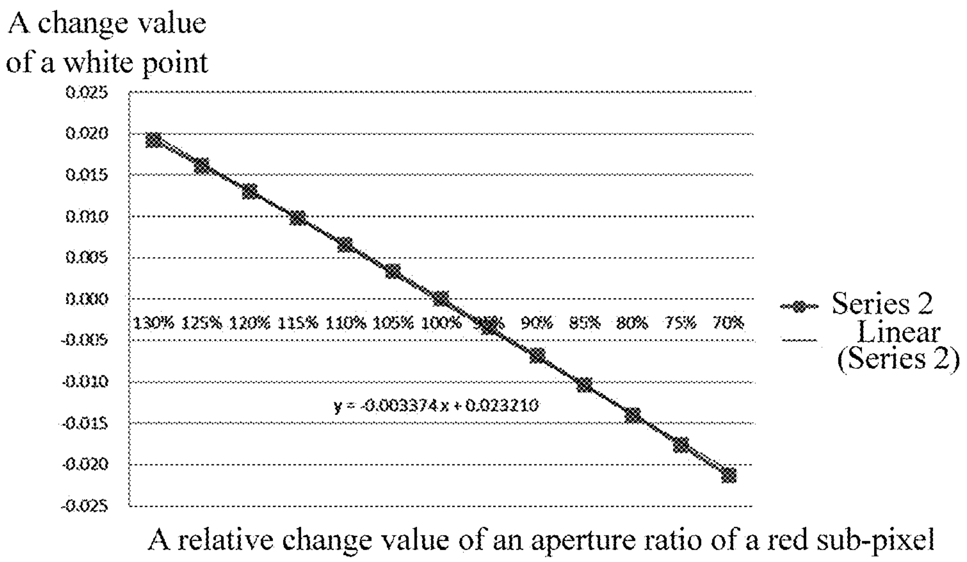
FIG. 3 illustrates a coordinate schematic diagram which is established with a relative change value of an aperture ratio of a first sub-pixel as an X-axis and Wx as a Y-axis.

Please refer to Table 2 and FIG. 3. In the step S60, the calculation formula between the relative change value of the aperture ratio of the first sub-pixel and the Wx is fit and obtained as follows: $Wx=-0.003374x+0.02321$. x is the relative change value of the aperture ratio of the first sub-pixel of each of the at least one test display device.

As shown in Table 2, in the present embodiment, a relative change value of the Wy relative to the chromaticity Wy corresponding to the white image of the initial display device is further simulated and calculated when the relative change value of the test aperture ratio of the first sub-pixel of the test display device relative to the initial aperture ratio of the first sub-pixel of the initial display device is ranged from 100% to 130% and from 70% to 100%.

Figure 4:
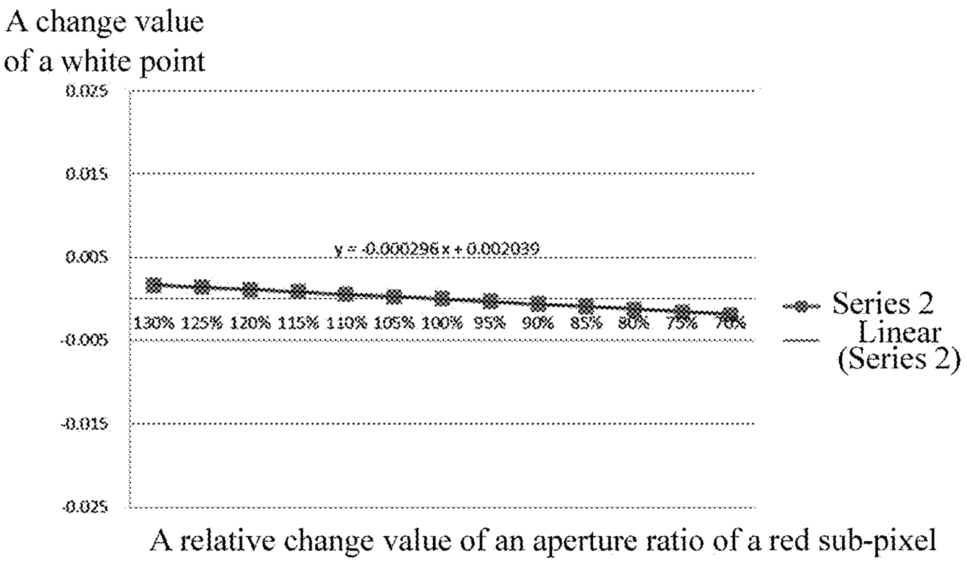
FIG. 4 illustrates a coordinate schematic diagram which is established with a relative change value of an aperture ratio of a first sub-pixel as an X-axis and Wy as a Y-axis.

Please refer to Table 2 and FIG. 4. In the step S60, the calculation formula between the relative change value of the aperture ratio of the first sub-pixel and the Wy is fit and obtained as follows: Wy=−0.000296x+0.002039. x is the relative change value of the aperture ratio of the first sub-pixel of each of the at least one test display device.

It can be known from the above simulation and calculation results that when the relative change value of the aperture ratio of the first sub-pixel changes, the influence on Wx is large and the influence on Wy is small. In practical applications, when Wx of a white image is too small and there is no difference in Wy or the difference is small, the aperture ratio of the first sub-pixel needs to be increased. When Wx of the white image is large and there is no difference in Wy or the difference is small, the aperture ratio of the first sub-pixel needs to be decreased. The method for adjusting the chromaticity of the display device in the present embodiment can adjust the aperture ratio of the first sub-pixel of the display device to meet a user's demand for the chromaticity of the white image, improve a color shift problem existing in the conventional display devices, and enhance display effect of the display device.

The method for adjusting the chromaticity of the display device and the display device provided by the present disclosure are described above in detail. Although the principles and implementations of the present disclosure are described by using specific examples in this specification, the descriptions of the foregoing embodiments are merely intended to help understand the method and the core idea of the method of the present disclosure. In addition, those skilled in the art can make modifications to the specific implementations and application range according to the idea of the present disclosure. In conclusion, the content of this specification is not construed as a limitation to the present disclosure.

What is claimed is:

1. A method for adjusting chromaticity of a display device, comprising the following steps:

in step S10, initial spectra of a first sub-pixel, a second sub-pixel, a third sub-pixel, and the backlight source of an initial display device are obtained, and an initial transmission spectrum of a display panel of the initial display device is calculated;

in step S20, an initial aperture ratio of the first sub-pixel of the initial display device is obtained, at least one test aperture ratio of a first sub-pixel of at least one test display device is preset, and a relative change value of each of the at least one test aperture ratio relative to the initial aperture ratio is calculated;

in step S30, at least one test transmission spectrum of a display panel of each of the at least one test display device is calculated according to the steps S10 and S20, wherein in the step S30, the test transmission spectrum of the display panel of each of the at least one display device is equal to [(an initial spectrum of the first sub-pixel×the relative change value of each of the at least one test aperture ratio relative to the initial aperture ratio)+an initial spectrum of the second sub-pixel+an initial spectrum of the third sub-pixel]/an initial spectrum of the backlight source;

in step S40, tristimulus values X, Y, and Z of each of the at least one test display device and tristimulus values X, Y, and Z of the initial display device are calculated according to each of the at least one test transmission spectrum and the initial transmission spectrum;

in step S50, chromaticity Wx and Wy corresponding to a white image of the initial display device and chromaticity Wx and Wy corresponding to a white image of each of the at least one test display device are calculated according to the step S40;

in step S60, a different value between the chromaticity Wx corresponding to the white image of each of the at least one test display device and the chromaticity Wx corresponding to the white image of the initial display device is calculated according to the step S50, and a calculation formula between the relative change value of the aperture ratio of the first sub-pixel and Wx is fit and obtained; and a different value between the chromaticity Wy corresponding to the white image of each of the at least one test display device and the chromaticity Wy corresponding to the white image of the initial display device is calculated according to the step S50, and a calculation formula between the relative change value of the aperture ratio of the first sub-pixel and Wy is fit and obtained; and in step S70, Wx required by a user is obtained, a relative change value of the aperture ratio of the first sub-pixel corresponding to the Wx required by the user is calculated according to the step S60, and an aperture ratio of the first sub-pixel corresponding to the Wx required by the user is calculated.

2. The method for adjusting the chromaticity of the display device of claim 1, wherein the first sub-pixel is a red sub-pixel.

3. The method for adjusting the chromaticity of the display device of claim 1, wherein in the step S10, the initial transmission spectrum is equal to (the initial spectrum of the first sub-pixel+the initial spectrum of the second sub-pixel+the initial spectrum of the third sub-pixel)/the initial spectrum of the backlight source.

4. The method for adjusting the chromaticity of the display device of claim 1, wherein in the step S20, the relative change value of each of the at least one test aperture ratio relative to the initial aperture ratio is equal to each of the at least one test aperture ratios/the initial aperture ratio.

5. The method for adjusting the chromaticity of the display device of claim 1, wherein in the step S40, the tristimulus values X, Y, and Z of each of the at least one test display device and tristimulus values X, Y, and Z of the initial display device are calculated according to the following formula:

$$X = k\int_{\lambda} S(\lambda)\cdot P(\lambda)\cdot \bar{x}(\lambda)d\lambda,$$

$$Y = k\int_{\lambda} S(\lambda)\cdot P(\lambda)\cdot \bar{y}(\lambda)d\lambda, \text{ and}$$

$$Z = k\int_{\lambda} S(\lambda)\cdot P(\lambda)\cdot \bar{z}(\lambda)d\lambda;$$

wherein K is an adjustment coefficient, S(λ) is the initial spectrum of the backlight source of the initial display device or an initial spectrum of a backlight source of each of the at least one test display device, P(λ) is the initial transmission spectrum or the test transmission spectrum, and $\bar{x}(\lambda)$, $\bar{y}(\lambda)$, and $\bar{z}(\lambda)$ are respectively standard chromaticity observer spectral tristimulus values.

6. The method for adjusting the chromaticity of the display device of claim 1, wherein in the step S50, the chromaticity corresponding to the white image of the initial display device and each of the at least one test display devices is calculated according to the following formula:

$$Wx = \frac{X}{X+Y+Z} \text{ and } Wy = \frac{Y}{X+Y+Z}.$$

7. The method for adjusting the chromaticity of the display device of claim 1, wherein in the step S60, the calculation formula between the relative change value of the aperture ratio of the first sub-pixel and the Wx is fit and obtained as follows: Wx=−0.003374x+0.02321, and x is the relative change value of the aperture ratio of the first sub-pixel of each of the at least one test display device.

8. The method for adjusting the chromaticity of the display device of claim 1, wherein in the step S60, the calculation formula between the relative change value of the aperture ratio of the first sub-pixel and the Wy is fit and obtained as follows: Wy=−0.000296x+0.002039, and x is the relative change value of the aperture ratio of the first sub-pixel of each of the at least one test display device.

9. A display device, performing chromaticity adjustment by a method for adjusting chromaticity of a display device; and the method for adjusting chromaticity of the display device comprising the following steps:

in step S10, initial spectra of a first sub-pixel, a second sub-pixel, a third sub-pixel, and the backlight source of an initial display device are obtained, and an initial transmission spectrum of a display panel of the initial display device is calculated;

in step S20, an initial aperture ratio of the first sub-pixel of the initial display device is obtained, at least one test aperture ratio of a first sub-pixel of at least one test display device is preset, and a relative change value of each of the at least one test aperture ratio relative to the initial aperture ratio is calculated;

in step S30, at least one test transmission spectrum of a display panel of each of the at least one test display device is calculated according to the steps S10 and S20, wherein in the step S30, the test transmission spectrum of the display panel of each of the at least one display device is equal to [(an initial spectrum of the first sub-pixel×the relative change value of each of the at least one test aperture ratio relative to the initial aperture ratio)+an initial spectrum of the second sub-pixel+an initial spectrum of the third sub-pixel]/an initial spectrum of the backlight source;

in step S40, tristimulus values X, Y, and Z of each of the at least one test display device and tristimulus values X, Y, and Z of the initial display device are calculated according to each of the at least one test transmission spectrum and the initial transmission spectrum;

in step S50, chromaticity Wx and Wy corresponding to a white image of the initial display device and chromaticity Wx and Wy corresponding to a white image of each of the at least one test display device are calculated according to the step S40;

in step S60, a different value between the chromaticity Wx corresponding to the white image of each of the at least one test display device and the chromaticity Wx corresponding to the white image of the initial display device is calculated according to the step S50, and a calculation formula between the relative change value of the aperture ratio of the first sub-pixel and Wx is fit and obtained; and a different value between the chromaticity Wy corresponding to the white image of each of the at least one test display device and the chromaticity Wy corresponding to the white image of the initial display device is calculated according to the step S50, and a calculation formula between the relative change value of the aperture ratio of the first sub-pixel and Wy is fit and obtained; and in step S70, Wx required by a user is obtained, a relative change value of the aperture ratio of the first sub-pixel corresponding to the Wx required by the user is calculated according to the step S60, and an aperture ratio of the first sub-pixel corresponding to the Wx required by the user is calculated.

10. The display device of claim 9, comprising a plurality of the pixel circuits of claim 1, wherein the first sub-pixel is a red sub-pixel.

11. The display device of claim 9, wherein in the step S10, the initial transmission spectrum is equal to (the initial spectrum of the first sub-pixel+the initial spectrum of the second sub-pixel+the initial spectrum of the third sub-pixel)/the initial spectrum of the backlight source.

12. The display device of claim 9, wherein in the step S20, the relative change value of each of the at least one test aperture ratio relative to the initial aperture ratio is equal to each of the at least one test aperture ratios/the initial aperture ratio.

13. The display device of claim 9, wherein in the step S40, the tristimulus values X, Y, and Z of each of the at least one test display device and tristimulus values X, Y, and Z of the initial display device are calculated according to the following formula:

$$X = k\int_{\lambda} S(\lambda)\cdot P(\lambda)\cdot \bar{x}(\lambda)d\lambda,$$

$$Y = k\int_{\lambda} S(\lambda)\cdot P(\lambda)\cdot \bar{y}(\lambda)d\lambda, \text{ and}$$

$$Z = k\int_{\lambda} S(\lambda)\cdot P(\lambda)\cdot \bar{z}(\lambda)d\lambda;$$

wherein K is an adjustment coefficient, S(λ) is the initial spectrum of the backlight source of the initial display device or an initial spectrum of a backlight source of each of the at least one test display device, P(λ) is the initial transmission spectrum or the test transmission spectrum, and $\bar{x}(\lambda)$, $\bar{y}(\lambda)$, and $\bar{z}(\lambda)$ are respectively standard chromaticity observer spectral tristimulus values.

14. The display device of claim 9, wherein in the step S50, the chromaticity corresponding to the white image of the initial display device and each of the at least one test display devices is calculated according to the following formula:

$$Wx = \frac{X}{X+Y+Z} \text{ and } Wy = \frac{Y}{X+Y+Z}.$$

15. The display device of claim 9, wherein in the step S60, the calculation formula between the relative change value of the aperture ratio of the first sub-pixel and the Wx is fit and obtained as follows: Wx=−0.003374x+0.02321, and x is the relative change value of the aperture ratio of the first sub-pixel of each of the at least one test display device.

16. The display device of claim 9, wherein in the step S60, the calculation formula between the relative change value of the aperture ratio of the first sub-pixel and the Wy is fit and obtained as follows: Wy=−0.000296x+0.002039, and x is the relative change value of the aperture ratio of the first sub-pixel of each of the at least one test display device.

* * * * *